United States Patent [19]

Ballyns

[11] Patent Number: 4,975,679
[45] Date of Patent: Dec. 4, 1990

[54] PRESSURE SENSOR SYSTEM

[76] Inventor: Jan Ballyns, 1125 Meadowlane Crescent, Pickering, Ontario, Canada, L1X 1E5

[21] Appl. No.: 447,807

[22] Filed: Dec. 8, 1989

Related U.S. Application Data

[63] Continuation-in-part of Ser. No. 202,262, Jun. 6, 1988, Pat. No. 4,890,090.

[51] Int. Cl.$^5$ .............................................. B60C 23/00
[52] U.S. Cl. .................................... 340/442; 340/447; 340/626; 200/61.22; 200/61.25; 200/83 A; 116/34 R; 73/146.8; 73/146.5
[58] Field of Search ................ 340/442, 447, 590–593, 340/626, 665; 200/61.22, 61.25, 83 R, 83 N, 83 A, 81 R; 116/34 R, 34 A, 34 B; 73/146.3, 146.5, 146.8, 146.2

[56] References Cited

U.S. PATENT DOCUMENTS

| | | | |
|---|---|---|---|
| 4,211,901 | 7/1980 | Matsuda et al. | 200/83 B |
| 4,890,090 | 12/1989 | Ballyns | 340/442 |

*Primary Examiner*—Donnie L. Crosland
*Attorney, Agent, or Firm*—Fetherstonhaugh & Co.

[57] ABSTRACT

A pressure sensor that responds to a predetermined rate of change of pressure in the fluid medium comprises a housing that encloses a pressure chamber which has a permeable wall and flexible diaphragm that separates the pressure chamber from the pressure sensitive system in which the sensor is used. The sensor diaphragm will be deflected to activate a transmitter when the pressure in the tire changes at a hazardous rate. The sensor will not activate the transmitter when the rate of change of pressure is less than a hazardous rate of change.

31 Claims, 10 Drawing Sheets

PRESSURE SENSOR SYSTEM

CROSS-REFERENCE TO RELATED APPLICATIONS

This application is a continuation in part of United States patent application Ser. No. 07/202,262 filed June 6, 1988 now U.S. Pat. No. 4,890,090.

BACKGROUND OF THE INVENTION

This invention relates to a pressure sensor that responds to a predetermined rate of change of pressure in a fluid medium of a pressure sensitive system. In particular, this invention relates to a pressure sensor which may be used in a tire pressure warning system for generating an alarm signal when the rate of change of pressure in the tire exceeds a hazardous rate of change.

DESCRIPTION OF RELATED ART

Pressure sensitive switches that respond to pressure changes in order to generate an alarm are well-known. The present pressure sensor, however, responds to a predetermined rate of change of pressure in a fluid medium rather than a simple pressure differential.

U.S. Pat. No. 4,211,901 Matsuda is directed to a pressure sensing switch for transducing the change of pneumatic pressure to an electrical signal. This device responds to the pressure differential between two chambers that are separated by a diaphragm. The device is designed to respond to the pressure differential between the two chambers and makes no allowance for circumstances where the rate of change of pressure in the pressure sensitive system which is being monitored is such that it does not represent the hazard.

U.S. Pat. No. 4,048,614 Shumway discloses the pressure detector and radio transmitter system for providing a tire pressure warning. This system is designed to generate an alarm when the air pressure drops below a set minimum operating pressure.

While it is important under certain circumstances to generate an alarm when the pressure in the pneumatic tire drops below a predetermined critical pressure, there are circumstances under which the mere reduction in pressure in the tire below a predetermined level is not hazardous.

The wall of a pneumatic tire and the seal formed between the tire and the rim are permeable to a certain extent and as a result the pressure in an inflated tire will fall over an extended period of time. This very gradual reduction in pressure is not hazardous when, for example, the inflated tire is mounted on a trailer of a vehicle which is held in storage for a matter of several months. It is quite common to have trailers stored in a marshalling yard for extended periods of time and if the tires of these vehicles were fitted with tire pressure alarms that responded to a reduction in the pressure in the tire, these alarms would go off frequently. Because these alarms are likely to be powered by a low-powered battery, the batteries are likely to run down when the alarms go off and are unattended with the result that it would be necessary to replace the batteries before the device could be effectively reactivated. This involves removing the tire from the rim. In some circumstances the fact that the alarm has gone off and the battery has discharged may not be readily evident and this could give the operator a false sense of security in that the operator is not aware of the fact that the device is inoperable.

In most motor vehicles a slow loss in the pressure in a tire is not hazardous. As previously indicated, all tires are permeable to some extent with the result that air is escaping on a continuous basis from virtually all inflated pneumatic tires. This loss in pressure only becomes hazardous when the rate at which it occurs is such that the pressure in the tire can drop below a critical pressure during on-road use.

SUMMARY OF INVENTION

It is an object of the present invention to provide a pressure sensor that responds to a predetermined rate of change of pressure in a fluid medium of a pressure sensitive system.

It is a further object of the present invention to provide a pressure sensor in which a pressure chamber is formed and wherein one of the walls of the chamber is a permeable wall which serves to permit the pressure in the pressure chamber to change at a predetermined rate and wherein one of the walls of the pressure chamber is a flexible diaphragm that moves to a predetermined position in response to a predetermined change in the pressure differential between the pressure chamber and the pressure sensitive system with which the sensor communicates.

It is a further object of the present invention to provide a tire pressure alarm system that incorporates a pressure sensor that responds to a predetermined rate of change of the air pressure in the tire. And, if according to one aspect of the present invention there is provided a pressure sensor that responds to a predetermined rate of change of pressure in a fluid medium of a pressure sensitive system comprising; a housing having walls that enclose a pressure chamber, one of said walls being a flexible diaphragm that separates the pressure chamber from the pressure sensitive system, said diaphragm being movable to and fro between a first position and a second position in response to a predetermined change in the pressure differential between the pressure chamber and the pressure sensitive system, at least one of said walls being a permeable wall that is permeable to said fluid medium and having a sufficient permeability to permit the fluid medium to pass therethrough at a rate that will serve to permit equalization of the pressure in the pressure chamber and the pressure sensitive system to prevent displacement of the diaphragm to the second position when the rate of change of pressure in the pressure system is less than that which is indicative of a perdetermined rate of change, the permeable wall being sufficiently impermeable to prevent the passage of fluid medium therethrough at a rate that will serve to prevent equalization of the pressure in the pressure chamber and the pressure sensitive system at a rate that would prevent movement of the diaphragm from said first position to said second position when the predetermined rate of change occurs in the pressure sensitive system.

According to a further aspect of the present invention, there is provided a pneumatically operated pressure sensitive electrical switch for detecting a hazardous rate of change of pressure in a pressure sensitive penumatic system comprising; a housing having walls that enclose a pressure chamber, a flexible diaphragm mounted in said housing, said diaphragm forming one of said walls of said pressure chamber, said diaphragm serving to separate the pressure chamber from said pressure sensitive penumatic system in use, said diaphragm being free to move independently to and fro between a first position and a second position in response to said hazardous rate of change in the pressure in the system, one of said walls of said pressure chamber being a permeable wall which is sufficiently permeable to permit air to pass therethrough at a rate which will serve to permit equalization of the pressure on opposite sides of the diaphragm at a rate that would prevent the detection of a change in the pressure in said pressure sensitive system which occurs at a rate that is less than said hazardous rate, said permeable wall being sufficiently impermeable to prevent the passage of air therethrough at a rate which will serve to prevent equalization of the pressure on opposite sides of the diaphragm at a rate which would prevent the movement of the diaphragm from said first position to said second position when said hazardous rate of change occurs in the pressure in said pressure sensitive system, switch means carried by said housing and communicating with said diaphragm to open and close in response to movement of said diaphragm to and fro between said first and second positions.

According to yet another aspect of the present invention, there is provided in an inflation chamber of a tire which is inflated to a predetermined inflation pressure the improvement of an alarm system for generating an alarm signal when air leaks from the inflation chamber at a rate which could be hazardous comprising; a housing mounted in said inflation chamber, said housing having a wall that forms a pressure chamber therein, a flexible diaphragm mounted in said housing, said diaphragm forming one of said walls of said pressure chamber, said diaphragm serving to separate the pressure chamber from said inflation chamber such that said diaphragm is free to move independently to and fro between a first position and a second position in response to said hazardous rate of change in the pressure in the inflation chamber, one of said walls of said pressure chamber being a permeable wall which is sufficiently permeable to permit air to pass therethrough at a rate which will serve to permit equalization of the pressure in the pressure chamber and the inflation chamber on opposite sides of the diaphragm at a rate that will prevent the detection of a change in the pressure in said inflation chamber which occurs at a rate that is less than said hazardous rate, said permeable wall being sufficiently impermeable to prevent the passage of air therethrough at a rate which will serve to prevent equalization of the pressure in the pressure chamber and the inflation chamber on opposite sides of the diaphragm at a rate which would prevent the movement of the diaphragm from said first position to said second position when said hazardous rate of change occurs in the pressure in said pressure sensitive system, alarm means communicating with said diaphragm and operable to generate an alarm signal in response to movement of said diaphragm from said first position to said second position.

PREFERRED EMBODIMENT

The invention will be more clearly understood after reference to the following detailed specification read in conjunction with the drawings wherein.

Figure 1:
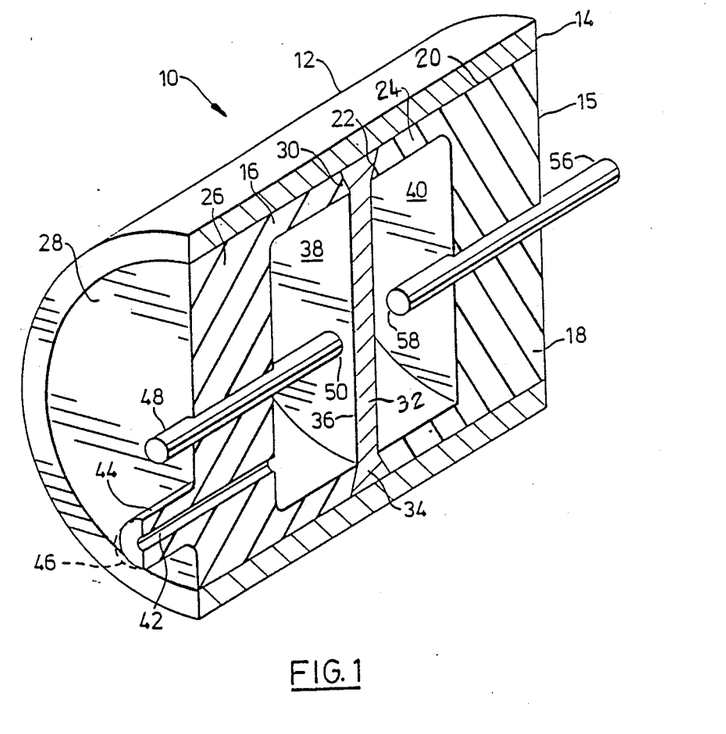
FIG. 1 is a sectional side view of a pressure sensitive electrical switch constructed in accordance with an embodiment of the present invention.

With reference to FIG. 1 of the drawings, the reference numeral 10 refers generally to a pressure sensitive electrical switch constructed in accordance with an embodiment of the present invention.

The pressure sensitive electrical switch 10 comprises a housing 12 which is constructed from three components which are identified by the reference numerals 14, 15 and 16. The component 14 is a cylindrical-shaped sleeve member which has a bore 20. The component 14 is made from a material which will act as a conductor such as brass or copper.

The component 16 is formed from an insulating material and has a cylindrical side wall 26 and an end wall 28. The cylindrical side wall 26 has an end face 30 which is outwardly and rearwardly inclined toward the end wall 28. The cylindrical side wall 26 is proportioned to fit in an interference fitting relationship within the bore 20 of the component 14. The component 15 is formed from an insulating material and has a cylindrical side wall 24 and an end wall 18. The side wall 24 has an end face 22 which is outwardly and rearwardly inclined toward the end wall 18. A flexible diaphragm 32 is formed with a perimeter mounting ring 34 and a thin flexible membrane 36. The mounting ring 34 is wedged between the end face 22 and the end face 30. It will be seen that the mounting ring 34 will be urged into contact with the inner face of the component 14 to form a good electrical contact therebetween.

The components 14, 15 and 16 and the flexible diaphragm 32 are assembled as shown in FIG. 1 such that the membrane 32 serves to separate the first pressure chamber 38 from the second pressure chamber 40. The second pressure chamber 40 is a sealed chamber. The first pressure chamber 38 has an access passage 42 which extends through a nipple 44 which is initially closed by a frangible end wall 46. The components 14, 15 and 16 and the diaphragm are assembled in an environment which is pressurized to the ambient or control pressure which is required in the second chamber 40 in use. When the device is to be used in a tire of a truck or the like the control pressure is about 100 psi.

A first electrical conductor 48 is mounted in the end wall 28 and projects into the first pressure chamber 38. The inner end 50 of the first electrical conductor 48 is arranged to spaced from the diaphragm 32 and serves to form a first electrical contact.

A second electrical conductor 56 is mounted in the end wall 18 and projects therethrough. The second electrical conductor 56 serves to provide a second contact 58 which is arranged in a spaced relationship with respect to the membrane 36 when it is in its normal position illustrated in FIG. 1. Preferably, the contacts 50 and 58 are equally spaced from the membrane 36. It will be apparent that when a pressure differential is established between the chambers 38 and 40, the flexible membrane 36 will be deflected toward the low pressure chamber and when a predetermined pressure differential is established, the membrane 36 will make contact with one or other of the contacts 50 or 58 to effectively close the switch to permit current to flow through the component 14, membrane 36 and either of the conductors 48 or 56 depending upon which of the conductors is in contact with the diaphragm 36.

The flexible diaphragm 32 is made from an electrically conductive silicone rubber material such as that manufactured by Armet Industries Corporation of Tilsonburg, Ontario, Canada. This material is normally considered to be substantially impermeable to air, however, a significant amount of air may permeate the membrane 36 if a pressure differential is maintained between the chambers 38 and 40 for an extended period of time (i.e. several days). Because of the gradual equalization of pressure resulting from the permeability of the membrane 36 the membrane will not be deflected to contact the conductors unless the rate of charge of the pressure in the pressure chamber 40 exceeds the rate at which the fluid medium permeates the membrane 36.

By pressurizing the chambers 38 and 40 to an initial pressure which is close to the operating pressure in the system which is to be monitored, the membrane 36 will assume the neutral position. When the switch is to be used, the end wall 46 is removed from the nipple 44 to open the passageway 42. The passageway 42 is then placed in communication with the pressure system which is to be monitored so that the pressure in the system is applied to the first pressure chamber 38. If the pressure differential between the chambers 38 and 40 is greater than that within which the switch is designed to remain open, the flexible membrane 36 will be deflected into contact with one or other of the contacts 50 or 58 as previously indicated to close the switch 10.

When the pressure sensitive switch 10 is assembled in a pressurized environment, the chambers 38 and 40 are pressurized to a pressure which is substantially equal to the normal operating pressure. Any pressure differential which is initially present will gradually diminish as a result of the fact that the air will eventually permeate the membrane 36. The air pressure is maintained in the chambers 38 and 40 by reason of the end wall 46 which closes the passage 42.

Figure 2:
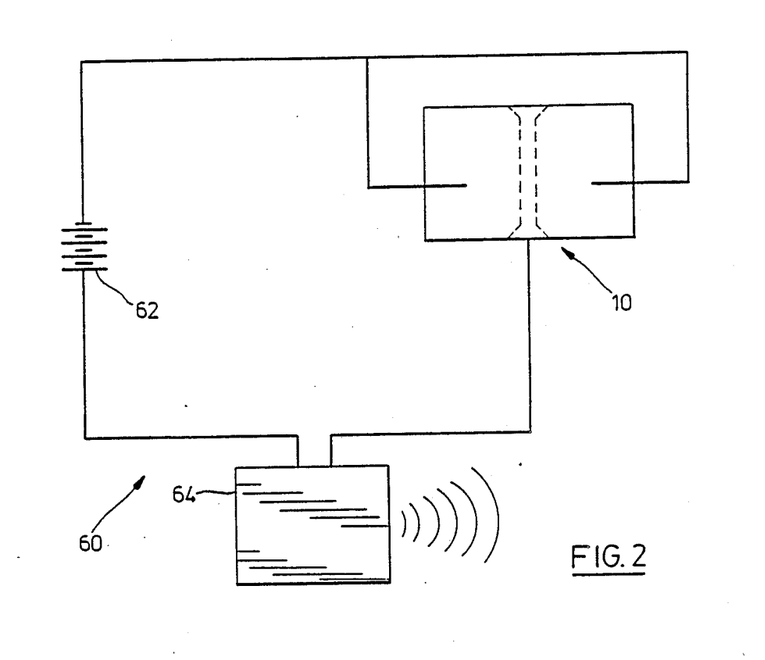
FIG. 2 is a diagram illustrating a pressure sensitive transmitter assembly incorporating the pressure sensitive switch of FIG. 1.

As shown in FIG. 2 of the drawings, the switch 10 may be used to advantage in a pressure sensitive transmitter assembly 60. The transmitter assembly 60 includes a power source in the form of an electrical battery 62 and a transmitter 64. A pressure sensitive transmitter assembly 60 of the type described in FIG. 2 of the drawings which is to be used in a tire pressure warning system may employ a battery such as one or more double-A 1.5 volt long-life batteries and a transmitter in the form of a commercially available short-wave radio transmitter such as the type commonly used to control the opening and closing of garage door mechanisms or the like.

Figure 3:
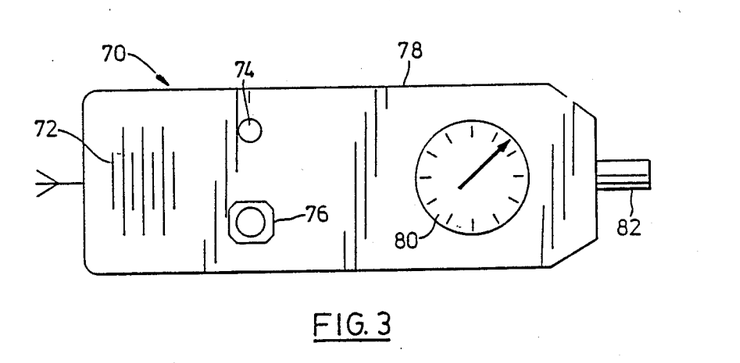
FIG. 3 is a diagrammatic representation of a receiver for use in association with the transmitter of FIG. 1.

A portable receiver suitable for use in association with the transmitter assembly of FIG. 2 is generally identified by the reference numeral 70 in FIG. 3 of the drawings. The receiver 70 may be of any conventional construction compatible with the transmitter 42. The receiver 70 has an audible alarm 72 and a visual alarm 74. The audible alarm 72 may be in the form of an alarm buzzer and the visual alarm may be in the form of an LED. A cancellation button 76 is provided for interrupting the alarm circuit of the receiver. Receivers which generate audible alarms and activate visually detectable indicators in response to the receipt of a predetermined signal are well known and will not therefore be described in detail. The receiver of the present invention is mounted in a portable housing 78 in which a conventional pressure gage 80 may also be mounted. The pressure gage 80 has a connecting nipple 82 of a type suitable for forming a connection with the inflation valve of a tire or the like. The pressure gage 80 is designed to give a reading of the pressure detected when the connecting conduit 82 is coupled to a valve of a tire or the like.

Figure 4:
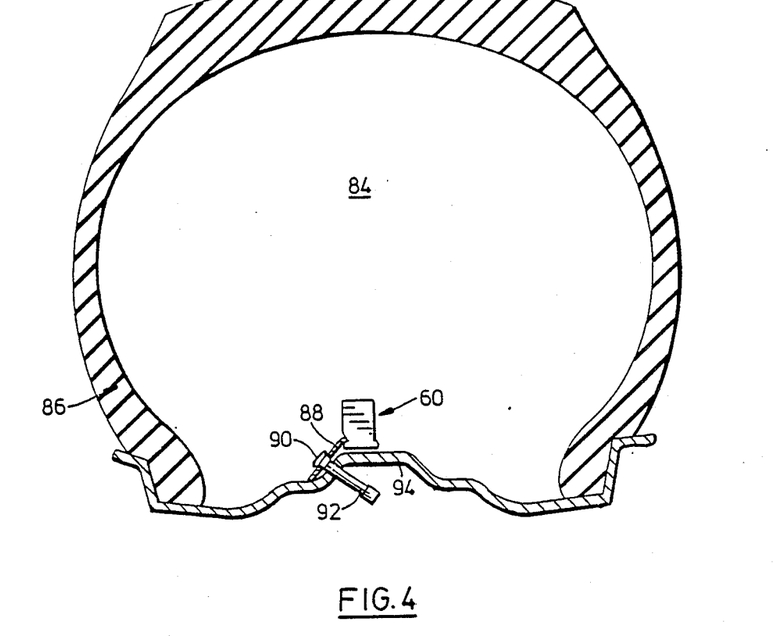
FIG. 4 is a sectional view taken through an inflated wheel assembly illustrating the manner in which the transmitter and pressure sensitive switch are mounted within the inflation chamber of a tire.

As shown in FIG. 4, the pressure sensitive transmitter assembly 60 is mounted within the inflation chamber 84 of a pneumatic tire assembly of the type generally identified by the reference numeral 86. In this embodiment the transmitter assembly 60 is mounted on a bracket 88 which is in turn mounted on the inner end 90 of the valve stem 92 which is mounted on the well rim 94.

Figure 5:
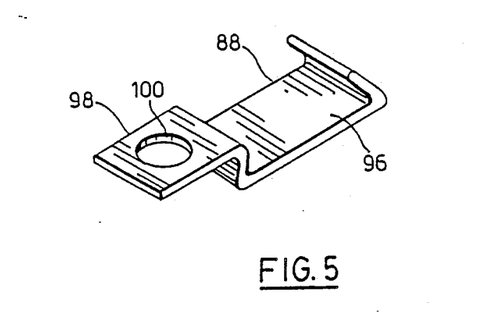
FIG. 5 is a pictorial view of the mounting bracket of FIG. 4.

The mounting bracket 88 is illustrated in FIG. 5 of the drawings wherein it will be seen that it is shaped to provide a seat 96 and a mounting flange 98 in which a mounting passage 100 is formed. The mounting passage 100 is proportioned to receive the valve stem 92. The seat 96 has a generally dove-tail configuration.

Figure 6:
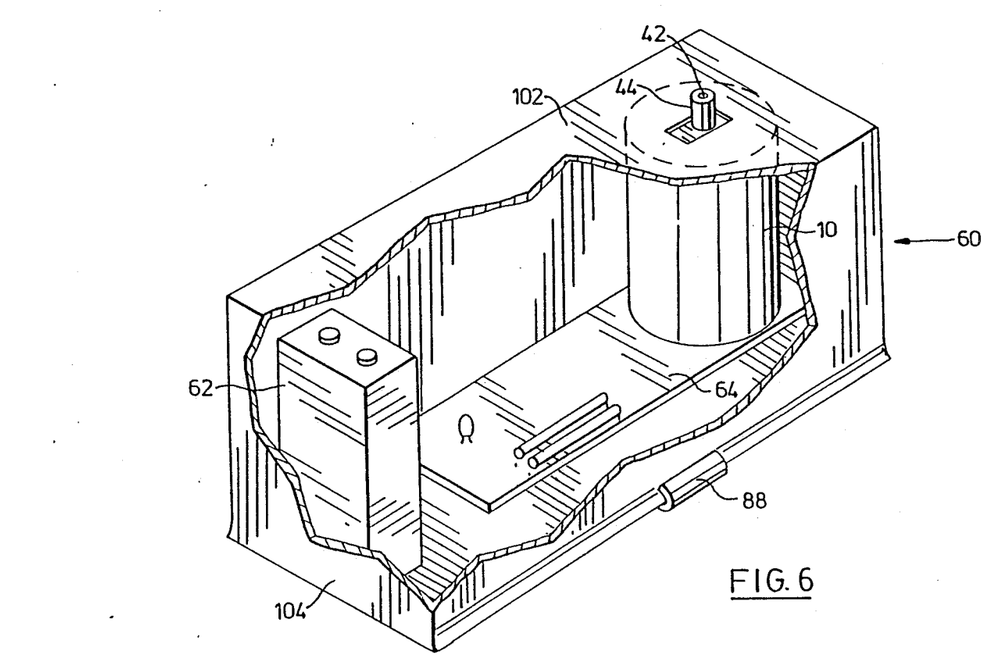
FIG. 6 is a partially sectioned pictorial view of a pressure sensitive transmitter assembly.

With reference to FIG. 6 of the drawings, it will be seen that the transmitter assembly 60 is mounted in a housing 102 which has a base portion 104 which has a dove-tail cross-sectional configuration corresponding to that of the seat 88. The battery 62, transmitter 64 and pressure-sensitive switch 10 are all accommodated within the housing 102 with the nipple 44 projecting through a wall of the housing 102 so that the through passage 42 will open into the inflation chamber 84 (FIG. 4) when the end wall 46 (FIG. 1) is removed.

Figure 7:
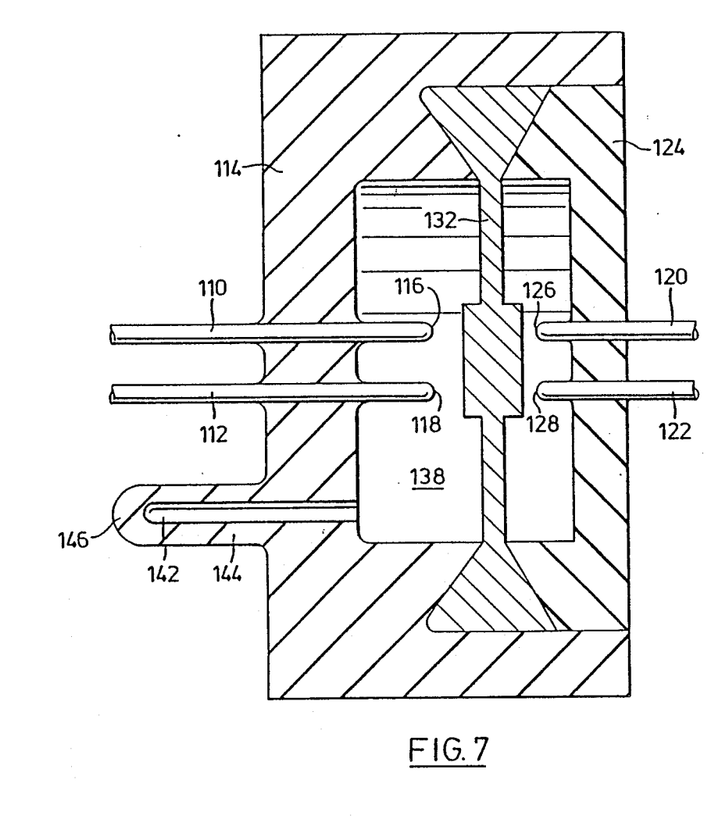
FIG. 7 is a sectional side view through a portion of a pressure sensitive switch constructed in accordance with a further embodiment of the present invention.

A pressure sensitive switch constructed in accordance with a further embodiment of the present invention is illustrated in FIG. 7 of the drawings to which reference is now made. In the embodiment illustrated in FIG. 7 of the drawing, conductors 110 and 112 are mounted in the end wall 114 in a spaced parallel relationship to provide contacts 116 and 118. Similarly, conductors 120 and 122 are mounted in the side wall 124 to provide terminals 126 and 128 on the opposite side of the diaphragm 132. An input passage 142 extends through a nipple 144 into the first chamber 138. The through passage 142 is normally closed by an end wall 146. In this embodiment, the diaphragm 132 is deflected into contact with the contacts 116, 118 or the contacts 126, 128 depending upon the direction in which the diaphragm is deflected. When the diaphragm makes contact with the contacts 116, 118, current can flow from the conductor 110 to the conductor 112. Similarly, when the diaphragm 132 makes contact with the contacts 126 and 128, current can flow through the conductor 120 to the conductor 122.

In a still further modification which is not shown, only one set of contacts 116, 118 may be provided on one side of a diaphragm so that movement of the diaphragm can make and break the contact between the contacts 116 and 118 as required in use.

Figure 8:
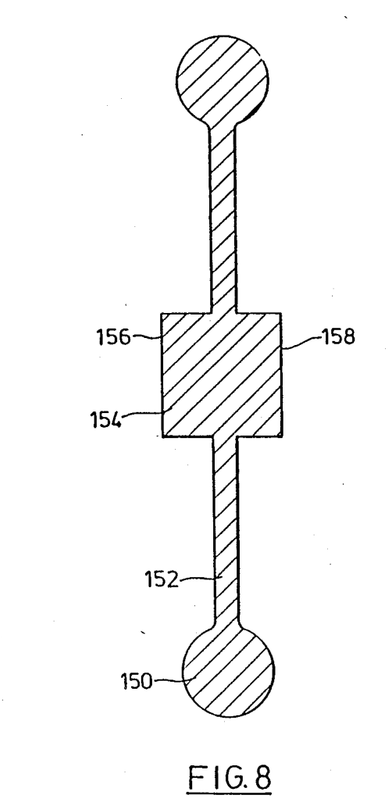
FIG. 8 is a sectional view taken through a membrane suitable for use in association with the switch constructed in accordance with FIG. 7.

A diaphragm suitable for use in the embodiments illustrated in FIG. 7 of the drawings is shown in cross-section in FIG. 8. The diaphragm includes an annular perimeter ring 150, a flexible membrane 152 and a central boss 154. As previously indicated, the diaphragm is made from a flexible material which is capable of conducting electricity. When the annular ring 152 is clamped between the shoulder 24 and end face 30 (FIG. 1), it will be deformed to assume the generally triangular configuration illustrated in FIG. 1 and this will serve to lock the ring 150 in the housing.

The boss 154 is particularly suitable for use in the embodiments illustrated in FIG. 7 of the drawings wherein it is desirable to provide flat end faces 156 and 158 in order to establish contact between the contacts 116, 118 and between the contacts 126, 128 as previously described. The boss 154 and the membrane 152 are each circular in front view.

As previously indicated, when the pressure sensitive switch is initially assembled, the chambers 38 and 40 are pressurized to a pressure which is about equal to the pressure in the environment in which the pressure sensitive switch is designed to operate in use. In a typical installation such as the inflation chamber of a pneumatic tire such as that used in the trucking industry, the chambers 38 and 40 would be pressurized to about 100 psi gage. The pressure sensitive switch can be stored in this condition for an extended period of time because little or no load will be applied to the membrane because there is little or no pressure differential between the pressure chambers 38 and 40 and any pressure differential which may initially exist will diminish by reason of the permeability of the membrane 36. When the pressure sensitive switch is to be used in the manner illustrated in FIG. 4 of the drawings, the end wall 46 of the nipple is removed to open the passage 42. As a result, the pressure in the chamber 38 will drop and the membrane 36 will be deflected to make contact with the contact 50. This procedure can be used to test the transmitter to ensure that it will function to emit a warning signal. When the pressure sensitive switch is installed, the tire is then inflated and inflation will continue until the required pressure is established within the inflational chamber 84. This pressure will be transmitted to the pressure chamber 38 of the pressure sensitive switch and will serve to deflect the membrane 36 back to the neutral position. If the tire is over-inflated, the membrane 36 will be deflected to make contact with the contact 58 and this will again activate the transmitter to generate a warning signal. After the tire has been correctly inflated, the membrane 36 will be located in a position which is very close to the neutral position shown in FIG. 1 of the drawings. If there is a pressure differential between the pressure in the inflation chamber 84 and that in the reference chamber 40, the pressure differential will be reduced in time by reason of the permeability of the membrane 36. As previously indicated, even membranes which are considered to be substantially impermeable are not totally impermeable with the result that some transfer of air will take place over an extended period of time resulting in the elimination of pressure differentials which are maintained over a long period of time. If, however, the pressure in the inflation chamber 84 decreases or increases to an undesirable extent at a rate which is greater than the rate at which air can permeate the membrane 36, the membrane 36 will be deflected to form contact with the contact 50 or 58 to activate the transmitter which will in turn emit a warning signal which will activate the alarm mechanisms of the receiver as previously described.

Figure 9:
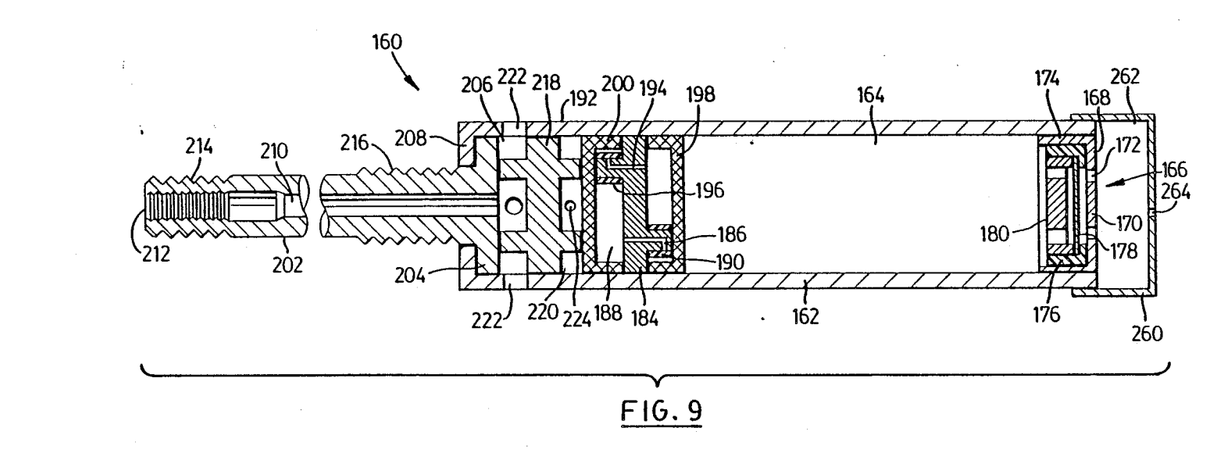
FIG. 9 is a sectional side view of a tire pressure arm system constructed in accordance with a further embodiment of the present invention.

A further embodiment to the present invention is illustrated in FIG. 9 on the drawings wherein reference number 160 refers generally to a pressure sensor and alarm system for use in a pneumatic tire.

The pressure sensor system 160 includes a housing 162 in which a pressure chamber 164 is formed. A pressure sensitive electrical switch which is generally identified with reference number 166 is mounted at one end of the housing 162 and serves to form a wall of the pressure chamber 164. The switch 166 consists of an end cap 168 which is formed from an electrically conductive material and has an end wall 170 through which a plurality of passages 172 open to permit the fluid medium to pass to and fro between the chamber 262 and the chamber 173. The end cap 168 also has a tubular wall portion 174 which fits in a close fitting relationship within the end of the housing 162. An electrically insulating collar 176 is located inwardly from the tubular wall 174. A flexible diaphragm 178 is mounted within the switch 166 and is retained therein by means of a retaining wall 180. The retaining wall 180 has a plurality of passage ways 182 which open therethrough such that the fluid pressure within the pressure chamber 164 is applied to one side of the diaphragm 178. A transmitter and battery (not shown) may be located within the pressure chamber 164 with electrical connections being made between the battery, the terminals and the electrically conductive retaining wall 180 and the electrically conductive end cap 168. It will be seen that the collar 176 which is made from an insulating material serves to prevent direct electrical contact between the retaining wall 180 and the end cap 170. The diaphragm 178 is made from an electrical conductive material and is in contact with the retaining wall 180 when it is in its normal position shown in FIG. 9. It will be understood that when the pressure in the pressure chamber 164 exceeds the pressure in the inflation chamber by an amount such that a predetermined pressure differential exists between the pressure chamber 164 and the inflation chamber of the pneumatic tire in which the device is mounted in use, the diaphragm 178 will be deflected into contact with the end wall 170 of the end cap 168 to complete the electrical circuit and thereby activate the transmitter as previously described.

An end cap 260 is mounted on the housing 162 and serves to form an antechamber 262 which communicates with the diaphragm 178 through the passage 172. A small access passage 264 opens into the antechamber 262. The access passage 264 serves to ensure that the pressure in the antechamber 262 will not increase or decrease at a rate which is as great as the rate at which the pressure in the inflation chamber of the tire changes in response to movement of the wheel along a rough road surface or the like. The addition of the end cap serves to provide a "damper" which prevents the application of "spike" pressures to the diaphragm. It will be noted, however, that the passage 264 is sufficiently large to ensure that the pressure in the antechamber 262 will increase at a rate substantially in excess of that required in order to indicate the hazardous rate of change in the inflation chamber.

A second wall assembly of the pressure chamber 164 is generally identified by the reference numeral 184. This second wall has a first protuberance 186 which projects into the pressure chamber 164. A charging passage 188 extends through a second wall 184 and opens laterally outwardly through the site of the protuberance 186. A tubular sleeve 190 which is formed from a substantially impermeable elastic material extends over the protuberance 186 and serves to close the opening formed by the through passage 188. A similar protuberance 192 projects outwardly from the divider wall 184 and has a discharge passage 194 opening therethrough which is normally closed by a sleeve 196. A filter 198 extends over the inner face of the second wall 184 and serves to filter the fluid medium before it may be discharged from the pressure chamber through the discharge passage 194. A similar filter 200 extends over the outer face of the second wall 184 and serves to filter the fluid medium before it can pass through the charging passage 188.

A conventional air valve stem 202 has its inner end flange 204 seated in the chamber 206 so that it bears against the end wall 208. Through passage 210 extends through the stem 202 and has a threaded outer end portion 212 which serves to accommodate a Schrader valve external threads 214 provided to receive the conventional end cap bearing threads 216 are provided to facilitate the mounting of the valve in a conventional manner. A spacer 218 separates the flange 204 of the valve stem from the filter 192 and serves to form a further chamber 220. It will be understood that the pressure chamber 164, chamber 206 and chamber 220 each have a circular cross-sectional configuration or any other desired cross-sectional configuration. In use the pressure sensor system 160 is mounted on the rim of a wheel with the valve stem 202 projecting outwardly therefrom and the housing 162 located within the inflation chamber of the tire. A conventional one way valve is located in the threaded outer end 212 and the tire may then be inflated in a conventional manner. Air will then pass through the through passage 210 to enter the chamber 206. The air entering the chamber 206 will be discharged through the passages 222 into the inflation chamber of the tire. As the pressure within the pressure chamber of the tire increases, air will enter the chamber 220 through the passage 224. This air will pass through the filter 200 to the charging passage 188. Eventually the pressure in the chamber 220 will be sufficient to extend the sleeve 190 to an extent sufficient to open the access passage 188 to the pressure chamber 164. Air will continue to pass through the charging passage 188 until the pressure differential between the chamber 220 and the pressure chamber 164 is such that the sleeve 190 contracts to close the access passage. It will be noted that the sleeve 190 will act to prevent the pressure in the pressure chamber 164 rising above the pressure in the chamber 220 during the initial inflation stage and will serve to maintain the pressure chamber 164 at a pressure which is slightly less than that of the inflation chamber. The pressure differential which is maintained by the sleeve 190 is greater than that required to cause the flexible diaphragm 178 to be deflected into contact with the retaining wall 180. As a result during the initial inflation stage, the diaphragm 178 will be deflected into contact with the retaining wall 180 and will be supported by the retaining wall 180. The retaining wall 180 serves to insure that the diaphragm 178 will not be damaged in circumstances where the pressure differential between the inflation chamber and the pressure chamber 164 is greater than that which might otherwise be considered to be a hazardous differential. It will be understood that during the initial inflation of a pneumatic tire, it is quite common to inflate the tire to a pressure which is substantially above the normal operating pressure in order to insure that the tire is properly seated on the wheel rim. After the tire has been inflated to the installation pressure, air may then be discharged through the air valve and as a result the pressure in the tire inflation chamber may drop well below the pressure in the pressure chamber 164. When this occurs, the air may then be vented from the pressure chamber 164 through the discharge passage 194 by deflecting the sleeve 196. This discharging will continue until the pressure in the inflation chamber drops below the normal operating pressure. As a result the pressure differential between the pressure chamber 164 and the tire inflation chamber is such that the pressure in the chamber 164 exceeds the pressure in the inflation chamber by an amount which greater than that required to deflect the diaphragm 178 into contact with the end wall 170 and these will activate the transmitter. The tire is then re-inflated to increase the pressure in the inflation chamber to the required operating pressure. As a result, the pressure in the inflation chamber will once again exceed that in the pressure chamber. While the pressure differential is reduced by the passage of air through the charging passage 188, the pressure in the pressure chamber will remain slightly below that of the inflation chamber and consequently, the transmitter will be deactivated. Thereafter the permeability of the diaphragm will permit a gradual elimination of the pressure differential and the diaphragm will return to the neutral position. As a result of this procedure, the presence of an operable alarm device is signalled by the fact that the alarm is activated when air is vented from the overinflated tire. The alarm is, however, deactivated when the tire is reinflated to the operating pressure and will only be reactivated when a hazardous pressure drop occurs in the inflation chamber.

If as a result of a fast leak, the pressure in the tire inflation chamber drops at the hazardous rate which exceeds the rate of permeability of the diaphragm 178. The diaphragm 178 will be deflected into contact with the end wall 172 to activate the transmitter as previously described which will in turn activate the alarm system. As a result, an alarm signal will be generated. If, on the other hand, the pressure in the air inflation chamber of the tire increases or decreases at a rate which is less than that which is indicative of a hazardous rate of change, the permeability of the diaphragm 178 will insure that the diaphragm 178 is not deflected into contact with the end wall 178, and as a result the transmitter will not be activated.

The pressure sensor system illustrated in FIG. 9 can be installed in any pneumatic tire regardless of the cold inflation pressure required in the tire. The cold inflation pressure usually ranges from 28 to 30 psi for automobiles and 80 to 100 psi for truck tires. The charging passage 188 and the discharge passage 194 and their associated sleeves 190 and 196 serve to allow the pressure in the pressure chamber to be automatically adjusted to match the pressure in the tire and as a result, the sensor device of the present invention could just as easily be used in a high pressure or low pressure system because the pressure differential across the diaphragm will never exceed that permitted by the sleeves 190 and 196 which act as valves that open and close the charging and discharging passages 188 and 194.

Figure 10:
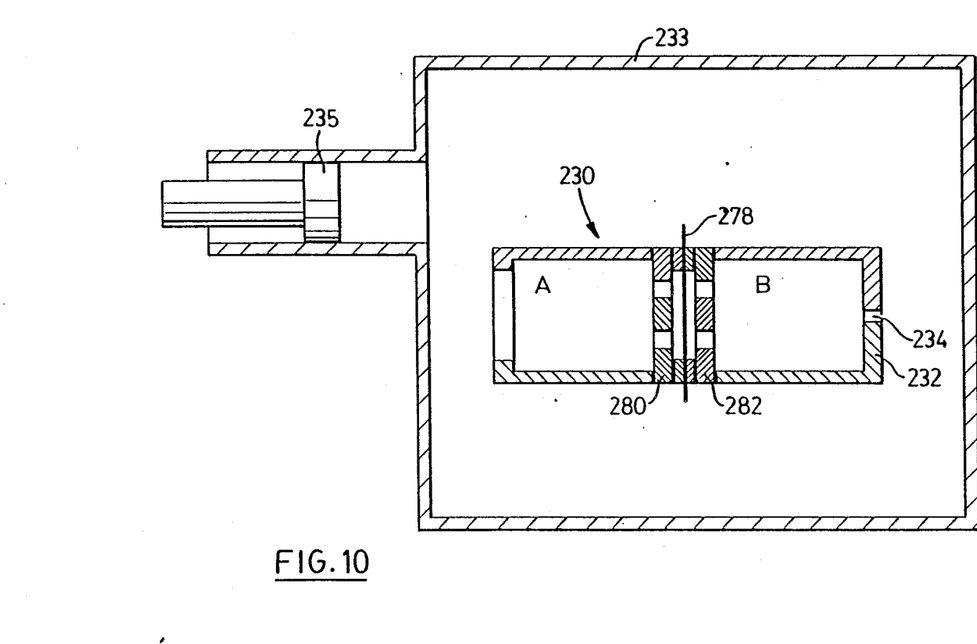
FIG. 10 is a diagrammatic representation of a pressure sensor constructed in accordance with a still further aspect of the present invention.

From the foregoing, it will be apparent that the pressure sensor system of the present invention is armed and ready to respond to a hazardous pressure change without the need to be electrically live. The system does not draw power from its electrical battery until the transmitter is activated as a result of the detection of a hazardous rate of pressure change in the tire. As a result, the operating life of the sensor system of the present invention may equal that of the tire in which it is installed in use. Obviously in circumstances where a defective tire is replaced or repaired, it is a simple matter to replace the sensor, and/or its battery. A further modification of the present invention as illustrated in FIG. 10 of the drawings wherein the rate of change sensor 230 as a pressure chamber B that is separated from the chamber A by means of a diaphragm 278. The end wall 232 is made permeable by providing a small orifice 234 which opens therethrough. In this device the diaphragm 278 is made from an electrical conductive material and the limit plates 280 and 282 are both electrically conductive and form terminals of a switch. When the pressure in the chamber B exceeds the pressure in the chamber A the diaphragm 278 may be deflected into contact with the wall 280 and when the pressure in the chamber A exceeds the pressure in the chamber B, the diaphragm may be deflected into contact with the wall 282.

The container 233 which is diagrammatically illustrated in FIG. 10 may be used for the purposes of calibrating the sensor switch of the present invention. When the capacity of the container 233 and the displacement of the plunger 234 are known, it is possible to change the pressure in the chamber A at a predetermined rate in order to determine the permeability of the permeable wall of the chamber B to insure that the diaphragm 278 will be displaced into contact with the wall 280 or the wall 282 when a hazardous rate of change in the pressure differential between the chambers A and B occurs.

Figure 11:
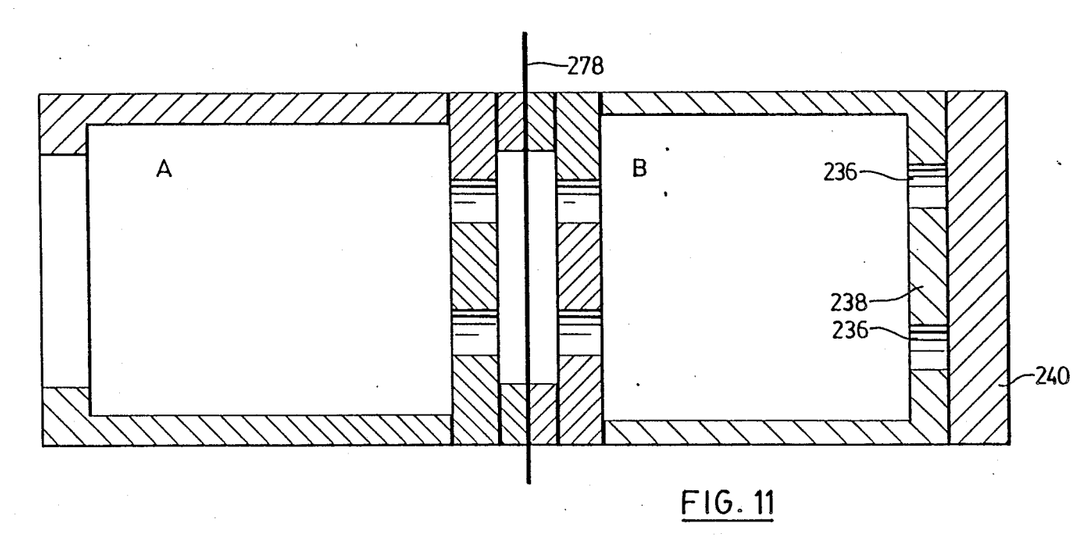
FIG. 11 is a diagrammatic representation of a pressure sensor illustrating a still further embodiment of the present invention.

A further embodiment of the present invention associated in FIG. 11 of the drawings wherein the permeable wall of the pressure chamber B is provided by forming passages 236 in an impermeable end wall 238 and apply a permeable cover plate 240 to the end wall 238. By reason of this structure, it is not necessary to make the diaphragm 278 from a permeable material.

Figure 12:
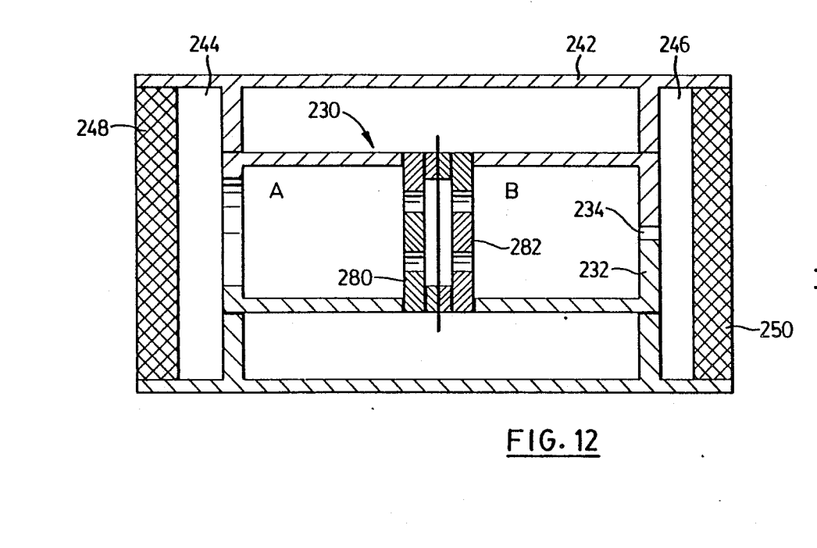
FIG. 12 is a diagrammatic representation of a pressure sensor illustrating a still further aspect of the present invention.

In a further embodiment illustrated in FIG. 12 the housing 230 is located in a filter housing 242 such that antechambers 244 and 246 are provided for the chambers A and B respectively. Filter elements 248 and 250 serve to filter the fluid medium before it can enter the chambers A and B respectively.

Figure 13:
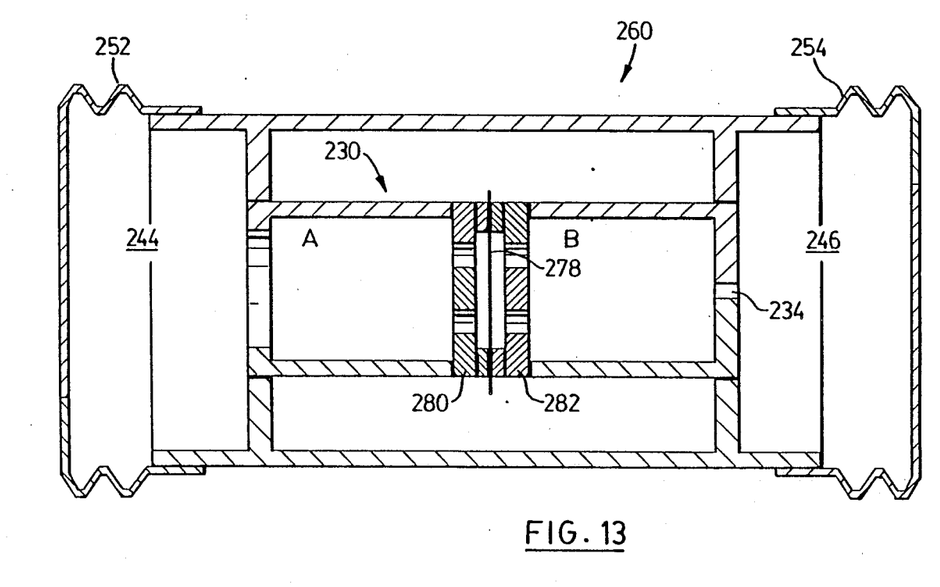
FIG. 13 is a diagrammatic representation of a pressure sensor illustrating yet another aspect of the present invention.

Yet another embodiment of the present invention is illustrated in FIG. 13 of the drawings wherein flexible bellows 252 and 254 enclose the antechamber 244 and 246 respectively. This structure is suitable for use in an environment where it is desirable to exclude the fluid medium in which the sensor is operating from the fluid medium in the pressure sensor system. It will be apparent that if the sensor system 260 of FIG. 13 is located in a pressure sensitive system in which the pressure drops the bellows 252 and 254 will both expand. If the rate at which the pressure drops is a hazardous rate, a pressure differential will be established between the chamber A and the chamber B because the passage 234 will not permit an equilibrium to be maintained between the chambers A and B; and as a result, the diaphragm 278 will be deflected into contact with the support valve 280 which will, in turn, activate the electrical system to generate an alarm. Similarly, if the pressure in the system in which the sensor 260 is located increases at a hazardous rate, the pressure in the chamber A will increase at a greater rate than the pressure in the chamber B; and as a result, the diaphragm 278 will be deflected into contact with the retainer wall 282 which will again complete the electrical circuit to activate an alarm.

Figure 14:
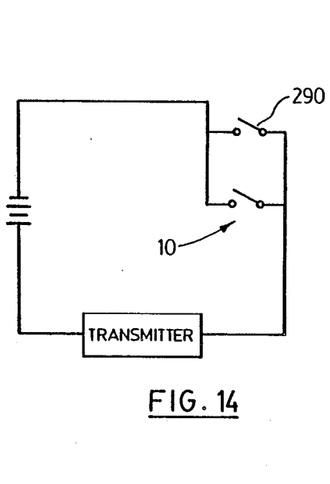
FIG. 14 is a circuit diagram illustrating a temperature switch arranged in series with the transmitter.

In the further modification illustrated in FIG. 14, a temperature sensitive switch 290 is provided in parallel with the switch 10. The switch 290 may be in the form of a normally open bimetallic switch which is temperature sensitive and will close to complete the circuit and generate an alarm when the temperature in the fluid medium in which it is located rises above a predetermined limit. As previously indicated, the sensor 10 compensates for temperature changes in the system and while this has distinct advantages, there are many applications in which it is desirable to generate an alarm when the temperature in the system exceeds a predetermined limit. For example, when a vehicle is operating with dual tires, one of the two tires of a set may be overloaded and may heat up until it explodes. The system illustrated in FIG. 14 will generate an alarm even if the pressure sensor is not activated by the change in pressure in the system.

As previously indicated, the pressure sensor of the present invention responds to the rate of change of pressure in the system which it monitors and is not affected by the actual pressure in the system. In addition, the pressure sensor is not affected by temperature changes in the system which it monitors because the sensor is housed within the system and temperature changes in the fluid which is being monitored will result in corresponding temperature changes in the sensor. This feature is particularly desirable when the sensor is used in a pneumatic tire where the temperature may vary substantially due to ambient temperature conditions or speed, load and road surface conditions. When the pressure sensor is mounted within the inflation chamber of a tire, pressure changes due to temperature changes will be substantially the same in the pressure chamber and in the inflation chamber and will not activate the alarm. In other systems where the tire pressure is compared to outside atmospheric pressure the changes in pressure resulting from temperature changes could cause the system to generate a false alarm. In these systems a drop in ambient temperature could also generate a false alarm.

Various further modifications of the present invention over and above those described herein will be apparent to those skilled in the art.

I claim:

1. A pressure sensor that responds to predetermined rate of change of pressure in a fluid medium of a pressure sensitive system comprising;
   (a) a housing having walls that enclose a pressure chamber,
   (b) one of said walls being a flexible diaphragm that separates the pressure chamber from the pressure sensitive system, said diaphragm being movable to and fro between a first position and a second position in response to a predetermine change in the pressure differential between the pressure chamber and the pressure sensitive system,
   (c) at least one of said walls being a permeable wall that is permeable to said fluid medium and having a sufficient permeability to permit the fluid medium to pass therethrough at a rate that will serve to permit equalization of the pressure in the pressure chamber and the pressure sensitive system to prevent displacement of the diaphragm to the second position when the rate of change of pressure in the pressure system is less than that which is indicative of a predetermined rate of change, the permeable wall being sufficiently impermeable to prevent the passage of fluid medium therethrough at a rate that will serve to prevent equalization of the pressure in the pressure chamber and the pressure sensitive system at a rate that would prevent movement of the diaphragm from said first position to said second position when the predetermined rate of change occurs in the pressure sensitive system.

2. A sensor as claimed in claim 1 wherein the permeable wall is a wall other than the flexible diaphragm.

3. A sensor as claimed in claim 2 wherein the permeability is achieved by providing orifice means in said permeable wall.

4. A sensor as claimed in claim 1 wherein passage means is formed in the permeable wall and a permeable cover member covers the passage means.

5. A sensor as claimed in claim 1 wherein the said diaphragm is formed from electrically conductive material.

6. A sensor as claimed in claim 5 wherein at least one electrically conductive plate is located in a side-by-side relationship with respect to said diaphragm so as to be spaced from said diaphragm when the diaphragm is in its first position and to make contact with said diaphragm when it is in said second position.

7. A sensor as claimed in claim 5 wherein said diaphragm is movable to a third position in which it is displaced from said first position in a direction opposite to the direction of displacement toward the second position, and wherein first and second electrically conductive plates are located one on either side of said diaphragm in a spaced relationship thereto whereby displacement of the diaphragm from the first position will establish contact between the diaphragm and the first conductive plate and displacement of the diaphragm to the second position will establish contact between the diaphragm and the second conductive plate.

8. A sensor as claimed in claim 1 further comprising a second chamber formed in said housing, said second chamber having an access passage for communicating with the pressure sensitive system whereby the pressure in the second chamber may change rapidly in response to a rapid change in pressure in the pressure sensitive system, said flexible diaphragm separating the pressure chamber from said second chamber.

9. A sensor as claimed in claim 1 further comprising a first antechamber formed between the permeable wall of the pressure chamber and the pressure sensitive system, said first antechamber having a first access passage for communicating with the pressure sensitive system.

10. A sensor as claimed in claim 9 wherein the first access passage is proportioned to restrict access to the first antechamber whereby short duration pressure surges in the pressure sensitive system will not result in displacement of the diaphragm to the second position.

11. A sensor as claimed in claim 8 further comprising a first antechamber formed between the permeable wall of the pressure chamber and the pressure system, said first antechamber having a first access passage for communicating with the pressure sensitive system and a second antechamber formed between the second chamber and the pressure sensitive system, the access passage from the second chamber opening into second antechamber, said second antechamber having an opening formed therein for communicating with the pressure sensitive system.

12. A sensor as claimed in claim 11 further comprising first and second filter means arranged in said first and second antechambers respectively to filter the fluid medium entering the first and second antechambers to prevent contamination of the permeable wall and the access passage of the second chamber.

13. A sensor as claimed in claim 8 further comprising a first antechamber formed between the permeable wall of the pressure chamber and the pressure system, said first antechamber having a first access passage for communicating with the pressure sensitive system, a second antechamber formed between the second chamber and the pressure sensitive system, the access passage of the second chamber opening into said second antechamber, said first and second antechambers having first and second flexible walls respectively for separating the first and second antechambers from the pressure sensitive system, the first and second flexible walls being sufficiently flexible to permit the hazardous pressure changes that occur in the pressure sensitive system to be communicated to the flexible diaphragm to deflect the diaphragm as required in use.

14. A sensor as claimed in claim 1 further comprising passage means opening into the pressure chamber through which said fluid medium may be admitted to the pressure chamber and flow control means communicating with said pressure chamber for preventing the flow of fluid medium into the pressure chamber unless the pressure differential between the pressure sensitive system and the pressure chamber exceeds the pressure differential required to deflect the flexible diaphragm between the first and second positions.

15. A sensor as claimed in claim 14 wherein the flow control means is adapted to prevent the discharge of fluid medium from the pressure chamber through said passage means unless the pressure differential between the pressure sensitive system and the pressure chamber exceeds the pressure differential required to deflect the flexible diaphragm between the second and third positions.

16. A sensor as claimed in claim 1 further comprising a charging passage opening into the pressure chamber through which said fluid medium may be admitted to the pressure chamber from the pressure sensitive system, and flow control means communicating with said charging passage, said flow control means being operable to open and close said charging passage, said flow control means serving to open said charging passage to admit the fluid medium to the pressure chamber when the pressure in the pressure sensitive system is greater than that in the pressure chamber by an amount such that the pressure differential is substantially greater than that required to move the diaphragm from said first position to said second position whereby the input of fluid medium to the pressure chamber will be interrupted before the pressure differential is reduced below that required for displacement of the diaphragm from said first position to said second position.

17. A sensor as claimed in claim 16 further comprising a discharge passage opening from the pressure chamber through which said fluid medium may be discharged from the pressure chamber to the pressure sensitive system and flow control means communicating with said discharge passage, said flow control means being operable to open and close said discharge passage, said flow control means serving to open said discharge passage to permit the fluid medium to escape from the pressure chamber when the pressure in the pressure chamber is greater than that in the pressure sensitive system by an amount such that the pressure differential therebetween is substantially greater than that required to move the diaphragm from said first position to said third position such that the discharge of fluid medium from the pressure chamber will be interrupted before the pressure differential is reduced that required for the displacement of the diaphragm to said third position.

18. A sensor as claimed in claim 16 wherein said diaphragm is movable to a third position in which it is displaced from said first position in the direction opposite to the direction of displacement toward said second position and wherein said sensor further comprises;
  (a) an input chamber formed in said housing,
  (b) a divider wall separating the input chamber from said pressure chamber,
  (c) a charging passage and a discharging passage each opening through said divider wall and communicating between the input chamber and the pressure chamber,
  (d) first one-way valve means in the charging passage, said first one-way valve being normally closed and operable to open to permit the fluid medium to pass from the input chamber to the pressure chamber when the pressure in the pressure sensitive system is greater than that in the pressure chamber by an amount such that the pressure differential is substantially greater than that required to move the diaphragm from said first position to said second position such that the input of fluid medium to the pressure chamber will be interrupted before the pressure differential as reduced below that required for displacement of the diaphragm to the second position,
  (e) second one-way valve means in the discharge passage, said one-way valve means being normally closed and being operable to open to permit the fluid medium to discharge from the pressure chamber when the pressure in the pressure chamber is greater than that in the input chamber by an amount such that the pressure differential therebetween is substantially greater than that required to move the diaphragm from said first position to said third position such that the discharge of fluid medium from the pressure chamber will be interrupted before the pressure differential is reduced below that required for deflection of the diaphragm from the third position to the first position.

19. A sensor as claimed in claim 18 wherein said divider wall has a first protuberance formed thereon that projects into the pressure chamber and through which said passage opens and said first one-way valve comprises a flexible sleeve which fits over the first protuberance and closes said charging passage, said flexible sleeve being sufficiently flexible to deflect under the influence of the pressure differential to permit the charging passage to open as aforesaid.

20. A sensor as claimed in claim 19 within the said divider wall has a second protuberance formed thereon that projects into the input chamber and through which the discharge passage opens, said second one-way valve comprising a flexible sleeve which fits over the second protuberance and normally closes said discharge passage, said second flexible sleeve being deflected under the influence of the pressure differential to permit the discharge passage to open as aforesaid.

21. A sensor as claimed in claim 18 further comprising a valve stem for a pneumatic tire having a proximal end and a distal end, and a primary tire inflation passage opening therethrough from the proximal end to the distal end, said proximal end of said stem being mounted in said housing such that the tire inflation passage opens into said input chamber, and secondary tire inflation passage means opening from said input chamber through which the air required to inflate a tire may pass from said input chamber to the inflation chamber of a tire in use.

22. A sensor as claimed in claim 1 further comprising switch means carried by the housing and communicating with said diaphragm to open and close in response to movement of the diaphragm between said first and second position.

23. A sensor as claimed in claim 21 further comprising alarm means for emitting an alarm signal when the pressure in the pressure sensitive system changes at the hazardous rate, said alarm means comprising a transmitter means located within said housing and electrically connected through said switch means to a power source compartment in which a power source is located in use so as to be activated when said switch is closed to transmit the warning signal, and alarm generating means remote from said tire for generating an alarm signal, and receiver means remote from said tire for receiving the warning signal which is emitted by the transmitter, said receiver means communicating with said alarm generating means to activate said alarm generating means to cause it to generate said alarm signal when the warning signal is received.

24. A pneumatically operated pressure sensitive electrical switch for detecting a hazardous rate of change of pressure in a pressure sensitive penumatic system comprising;
  (a) a housing having walls that enclose a pressure chamber,
  (b) a flexible diaphragm mounted in said housing, said diaphragm forming one of said walls of said pressure chamber, said diaphragm serving to separate the pressure chamber from said pressure sensitive penumatic system in use, said diaphragm being free to move independently to and fro between a first position and a second position in response to said hazardous rate of change in the pressure system,
  (c) one of said walls of said pressure chamber being a permeable wall which is sufficiently permeable to permit air to pass therethrough at a rate which will serve to permit equalization of the pressure on opposite sides of the diaphragm at a rate that would prevent the detection of a change in the pressure in said pressure sensitive system which occurs at a rate that is less than said hazardous rate, said permeable wall being sufficiently impermeable to prevent the passage of air therethrough at a rate which will serve to prevent equalization of the pressure on opposite sides of the diaphragm at a rate which would prevent the movement of the diaphragm from said first position to said second position when said hazardous rate of change occurs in the pressure in said pressure sensitive system, (d) switch means carried by said housing and communicating with said diaphragm to open and close in response to movement of said diaphragm to and fro between said first and second positions.

25. A switch as claimed in claim 24 wherein said flexible diaphragm is an electrically conductive diaphragm and said switch means comprises;
   (a) first conductor means having a first contact disposed opposite said flexible diaphragm so as to be out of contact with said diaphragm when it is in said first position and to make contact with said diaphragm when it is in said second position, said first conductor means being accessible for connection to an electrical circuit,
   (b) means for connecting said diaphragm to said electrical circuit such that said switch is open when said diaphragm is in its first position and closed when said diaphragm is in its second position.

26. A switch as claimed in claim 24 wherein a pressure sensing chamber is formed in said housing; said pressure sensing chamber being separated from said pressure chamber by said diaphragm.

27. A switch as claimed in claim 25, wherein said means for connecting said diaphragm to an electrical circuit comprises a second conductor means mounted in said housing and having a second contact located in a side-by-side spaced relationship with respect to said first contact so as to be out of contact with said diaphragm when it is in its first position and to make contact with said diaphragm when it is in said second position such that the first and second conductors are electrically connected to one another through said diaphragm when said diaphragm is in its second position.

28. A switch as claimed in claim 24 wherein said diaphragm is said permeable wall.

29. In an inflation chamber of a tire which is inflated to a predetermined inflation pressure the improvement of an alarm system for generating an alarm signal when air leaks from the inflation chamber at a rate which could be hazardous comprising;
   (a) a housing mounted in said inflation chamber, said housing having a wall that forms a pressure chamber therein,
   (b) a flexible diaphragm mounted in said housing, said diaphragm forming one of said walls of said pressure chamber, said diaphragm serving to separate the pressure chamber from said inflation chamber such that said diaphragm is free to move independently to and fro between a first position and a second position in response to said hazardous rate of change in the pressure in the inflation chamber,
   (c) one of said walls of said pressure chamber being a permeable wall which is sufficiently permeable to permit air to pass therethrough at a rate which will serve to permit equalization of the pressure in the pressure chamber and the inflation chamber on opposite sides of the diaphragm at a rate that will prevent the detection of a change in the pressure in said inflation chamber which occurs at a rate that is less than said hazardous rate, said permeable wall being sufficiently impermeable to prevent the passage of air therethrough at a rate which will serve to prevent equalization of the pressure in the pressure chamber and the inflation chamber on opposite sides of the diaphragm at a rate which would prevent the movement of the diaphragm from said first position to said second position when said hazardous rate of change occurs in the pressure in said pressure sensitive system,
   (d) alarm means communicating with said diaphragm and operable to generate an alarm signal in response to movement of said diaphragm from said first position to said second position.

30. An alarm system as claimed in claim 29 wherein said alarm means comprises;
   (a) transmitter means located within said inflation chamber and electrically connected to a power source through said pressure sensitive switch so as to be activated when said switch is closed to transmit a warning signal,
   (b) alarm generating means remote from said wheel for generating an alarm signal,
   (c) receiver means remote from said tire for receiving the warning signal which is emitted by the transmitter, said receiver means communicating with said alarm generating means to activate said alarm generating means to cause it to generate said alarm signal when the warning signal is received.

31. An alarm system as claimed in claim 30 wherein said diaphragm is said permeable wall.

* * * * *